(12) United States Patent
Takei et al.

(10) Patent No.: US 6,470,710 B1
(45) Date of Patent: Oct. 29, 2002

(54) METHOD FOR MELTING GLASS

(75) Inventors: Yusuke Takei, Tokyo (JP); Kenji Oda, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 09/549,345

(22) Filed: Apr. 13, 2000

(30) Foreign Application Priority Data

Apr. 21, 1999 (JP) .......................................... 11-114110

(51) Int. Cl.[7] ................................................ C03B 5/00
(52) U.S. Cl. ......................... 65/134.1; 65/134.9; 65/66
(58) Field of Search ............... 65/474, 134.9, 65/134.1

(56) References Cited

U.S. PATENT DOCUMENTS

| 3,954,432 A | * | 5/1976 | Hummel et al. ............... 65/27 |
| 5,665,137 A |   | 9/1997 | Huang |

FOREIGN PATENT DOCUMENTS

| EP | 0 253 188 | 1/1988 |
| EP | 0 967 180 | 12/1999 |
| GB | 1 445 825 | 8/1976 |
| JP | 56-104723 | 8/1981 |
| JP | 4-040293 | 7/1992 |
| JP | 6-293523 | 10/1994 |
| JP | 2871163 | 1/1999 |

OTHER PUBLICATIONS

S. Takehana, et al., pps. 296–298, "Glass Handbook," Sep. 30, 1975 (with partial English Translation).

* cited by examiner

Primary Examiner—Christopher A. Fiorilla
(74) Attorney, Agent, or Firm—Oblon, Spivak, McClelland, Maier & Neustadt, P.C.

(57) ABSTRACT

Glass raw material is fed to a glass furnace to prepare molten glass. At least one metal compound from one of the following metals: aluminum, titanium, silicon, zinc, magnesium, iron, chromium, cobalt, cerium or calcium is supplied to a foam layer formed on the molten glass to diminish or extinguish the foam layer.

11 Claims, 2 Drawing Sheets

METHOD FOR MELTING GLASS

The present invention relates to a method for melting glass, more precisely, to a method for melting glass to diminish or extinguish a foam layer formed on molten glass in a glass melting furnace during preparation of glass.

A glass melting furnace for continuously producing various glass products such as flat glass, container glass, CRT, glass tubes, etc. is basically composed of a melting chamber, a refining chamber and a heat recovering apparatus. The above chambers are divided with a partition called a shadow wall, a neck, a throat, etc.

In an example of a side port type furnace for melting glass, glass raw material is continuously fed from a raw material port provided at the upstream end of a melting furnace. The glass raw material is melted by means of an air burner or an oxygen burner using a fuel such as heavy oil and natural gas, arranged at the both sides of the melting furnace. After the raw material has been fully melted, molten glass is adequately refined and then is taken out from the downstream end of a refining chamber, and it is formed into glass products having desired shapes. In this context, an air burner means a burner using air as an oxygen source for combustion, and an oxygen burner means a burner using air rich in oxygen or a pure oxygen gas as an oxygen source for combustion.

During a procedure of glass melting, glass raw material fed from the material port is composed of cullet glass and a glass raw batch comprising various ingredients in order to prepare glass products having desired compositions. In general, the above glass raw batch and cullet glass mixed in a predetermined ratio are together supplied from the material port into a melting chamber. The fed material forms a raw material layer floating in molten glass and is pushed by the raw material newly fed towards a central portion of the melting chamber, as successively melted.

In the glass melting furnace mentioned above wherein the surface of the raw material layer is heated by a heating equipment such as an oil burner and a gas burner, the unmelted glass raw material layer is melted from its surface and gradually diminishes as it proceeds from the raw material port to the central portion. Then, it is extinguished at a position where the fed amount is balanced with its melting velocity. Around the area where the raw material layer extinguishes, foam is formed by a reaction of the material, and form a foam layer usually extending from a position at which the raw material layer extinguishes to a position of the highest temperature in the melting furnace to cover the surface of molten glass.

The above foam layer has a foamed surface which scatters thermal rays and reflects radiant heat from the flame of burners, a fume exhaust gas and refractory bricks. As a result, thermal transmittance to the molten glass beneath the foam layer is hindered to result in the lowering of the heat efficiency. The foam layer reflects radiant heat toward the ceiling and the side walls of a furnace to raise their temperature, which is one of the cause of the damage of the refractory brick. Further, the foam layer is numerous accumulated foam including gas in their inside. If the foam is not removed during the refining procedure, they will impair the quality of the molten glass and lower the yield of the product due to the foam contained.

The foam layer on the molten glass becomes thicker and longer, and tends to cause more damage toward the production, when glass products are manufactured from the molten glass on a lager scale and at a higher production speed. There is also a tendency for an increase in a thickness of the foam layer, when an oxygen type combustion of oil or a gas using an oxygen burner is employed. Accordingly, the foam layer on the molten glass is required to be suppressed or extinguished in the case of an oxygen type combustion using an oxygen burner as well as an air type combustion using an air burner.

The object of the present invention is to provide a method for melting glass for solving various problems caused by the foam layer, whereby the formation of the foam layer can be suppressed, and thickening of the foam layer can be prevented, and the formed foam layer can be extinguished or diminished in a short period of time.

The present invention has been made in order to solve the problems mentioned above, and is to provide a method for melting glass, which comprises melting glass material fed to a glass furnace to prepare molten glass, wherein supplying at least one metal compound which is a compound of at least one metal selected from the group consisting of aluminum, titanium, silicon, zinc, magnesium, iron, chromium, cobalt, cerium and calcium is supplied to a foam layer formed on the molten glass to diminish or extinguish the foam layer.

In the present invention, the metal compound having a function of diminishing or extinguishing the foam layer formed on the molten glass is selected from at least one compound of at least one metal selected from the group consisting of aluminum, titanium, silicon, zinc, magnesium, iron, chromium, cobalt, cerium and calcium. One or at least two of the metal compound in the form of a solution, a suspension, a powder, or a gas is supplied the foam layer formed on the molten glass. When the above metal compound is supplied, the foam layer is immediately extinguished or diminished. However, the foam layer will be recovered to its former state, once the supply of the metal compound is stopped. Accordingly, it is preferable to supply the metal compound to the foam layer continuously or intermittently.

As a method of supplying the metal compound, it is possible to employ a method wherein the metal compound is directly supplied to the foam layer by a spray apparatus such as a spray nozzle, provided through the side wall of a furnace. In the case of a glass furnace wherein a gas or oil is burned using air, it may be practical to employ an indirect method, wherein the metal compound is supplied into air for combustion in glass furnace by means of a spray, and is carried with the air to a combustion area to reach the foam layer. Further, it is also possible to employ a method, wherein the metal compound is mixed in a heavy oil or a gas beforehand, and supplied to the foam layer while burning a fuel using a combustion burner.

Moreover, in the case of a glass furnace wherein a gas or oil is burned using an oxygen gas, it may be practical to employ an indirect method, wherein the metal compound is mixed into an oxygen gas for combustion in a glass furnace by means of a spray, and is carried with an oxygen gas to the combustion area to reach the foam layer. The above metal compound may also be sprayed to supply it to the combustion area in a glass furnace.

The metal compound employed in the present invention may be an inorganic compound or an organic compound. At the time of reaching the foam layer on molten glass, the form of the metal compound may be an unreacted state, a reaction intermediate compound or a reaction product.

In particular, at the time just before reaching the foam layer on molten glass, the form of the metal compound is preferable to be metal oxide particles as fine as possible, caused by an oxidation reaction of the metal compound with aid of high temperature in a glass furnace. This may improve dispersion of the metal compound into the foam layer and the foam layer tend be easily diminished or extinguished. Accordingly, it is particularly preferable to employ an organic metal compound which is easily to form metal oxide particles by a decomposition oxidation reaction at a high temperature.

As such a representative example of the organic metal compound, the following may be mentioned.

As an organic titanium compound, a titanium ester such as tetraethyl titanate, tetrabutyl titanate, tetraisopropyl titanate, tetraoctylene glycol titanate, or its derivative, a titanium chelate such as dihydroxytitan lactate, hydroxytitanium dilactate, or its derivative, a titanium acylate or its derivative, or a titanium oxalate may, for example, be employed.

As an organic silicon compound, tetramethyl silicate, tetraethyl silicate, or tetra-n-propyl silicate, may, for example, be employed. As an organic aluminum compound, acetylacetone may, for example, be employed.

Above such a compound may be used in the form of a solution having dissolved in water and/or in an organic solvent in an optional proportion.

Moreover, as such a metal compound, a chloride, a sulfate or a nitrate of titanium, silicon or aluminum, such as silicon tetrachloride, titanium tetrachloride, aluminum trichloride, aluminum sulfate and aluminum nitrate may, for example, be employed. Such a metal compound may be sprayed in the form of a solution.

A compound such as titanium tetrachloride(melting point: −23° C., boiling point: 136.4° C.) and silicon tetrachloride (melting point: −70° C., boiling point: 57.6° C.) is a liquid at room temperature, but it has a low boiling point and can be easily vaporized. Such compound may be advantageous in handling since it can be vaporized by heating, and can be supplied to a foam layer by means of a carrier gas without using a solvent.

As such a organic solvent for the organic metal compound mentioned before, a solution which can dissolve or disperse uniformly such organic metal compound may be employed. The following various organic solvents may be mentioned as an example. An alcohol such as methanol, ethanol and isopropyl alcohol, a hydrocarbon such as hexane, benzene, toluene and xylene, a hydrocarbon oil such as gasoline and kerosine, an ester such as ethyl acetate and isobutyl acetate, a cellosolve such as methyl cellosolve and ethyl cellosolve. Ethanol, isopropyl alcohol, toluene, ethyl acetate, kerosine, etc. may be mentioned as a particularly preferred solvent in view of their price, availability and handling.

It is possible to employ a powder of at least one metal oxide which may be selected from the group consisting of aluminum oxide, titanium oxide, silicon oxide, zinc oxide, calcium oxide, magnesium oxide, iron oxide, chromium oxide, cobalt oxide and cerium oxide. Such a powder may be carried as it is by means of a gas or may be suspended in water and/or an organic solvent to form a slurry, which may be sprayed by a spray nozzle.

As the reason why the supply of the above metal compound to the foam layer can diminish or extinguishment of the foam layer in the present invention, it is considered that the surface tension will be influenced by the use of the metal compound. That is, such a metal compound having affinity with the glass forming foam will deposit on the surface of the foam in the foam layer, and then will penetrate into the glass forming foam to weaken the bonding power maintaining foam, which will bring about breakage of the foam.

Now, the present invention will be described with a reference to a preferred embodiment of a glass furnace for operating the present invention as shown in the attached drawings.

In the drawings, FIG. 1 is a plane view of an example of the glass furnace to which the present invention is applied.

Figure 1:
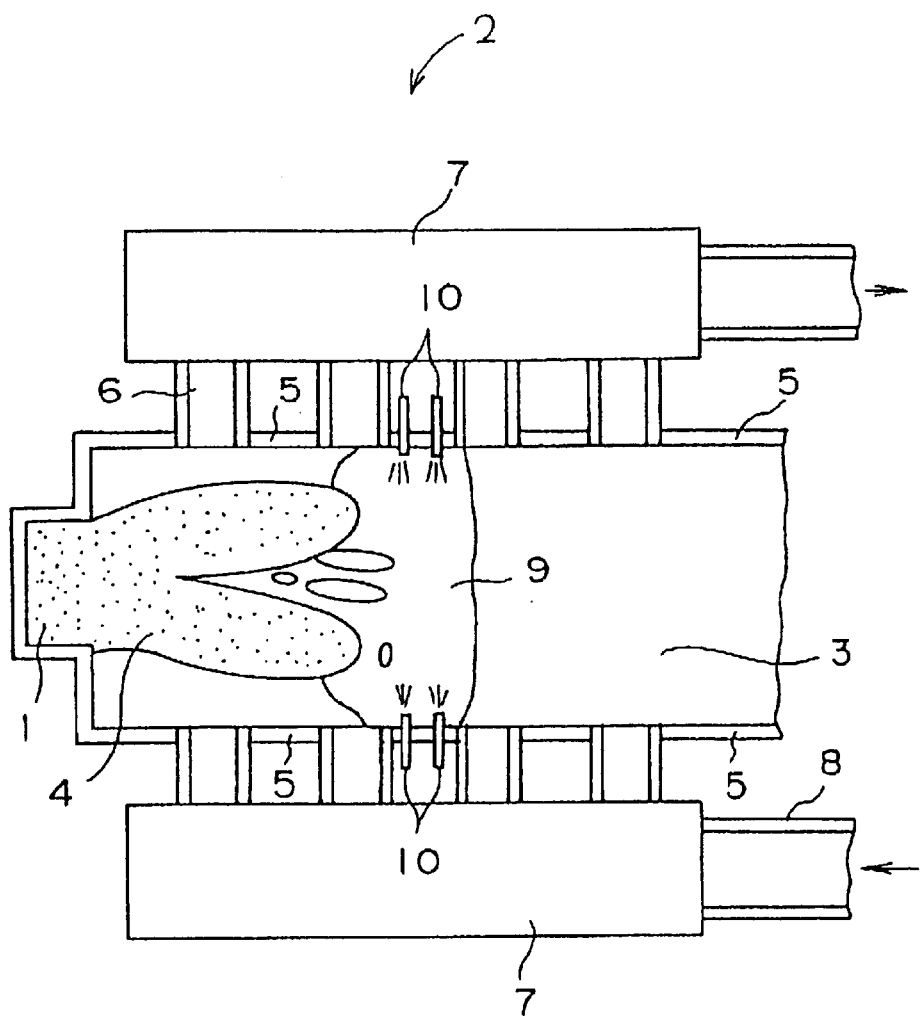
Figure 2:
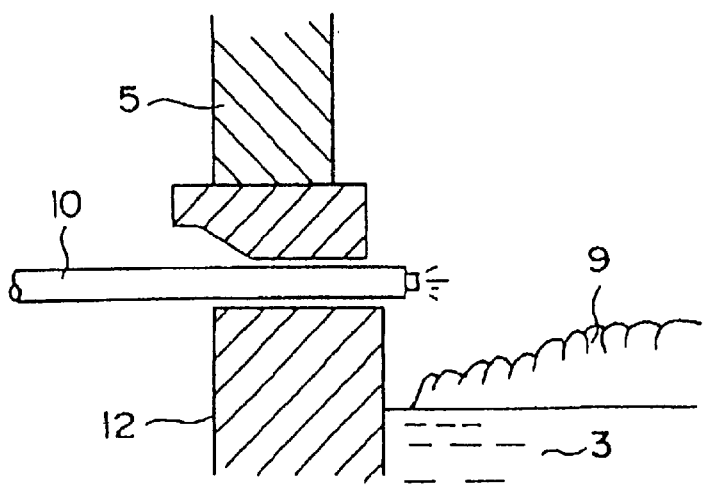
FIG. 2 is a schematic cross-sectional view of a heart part of the glass furnace.
Figure 3:
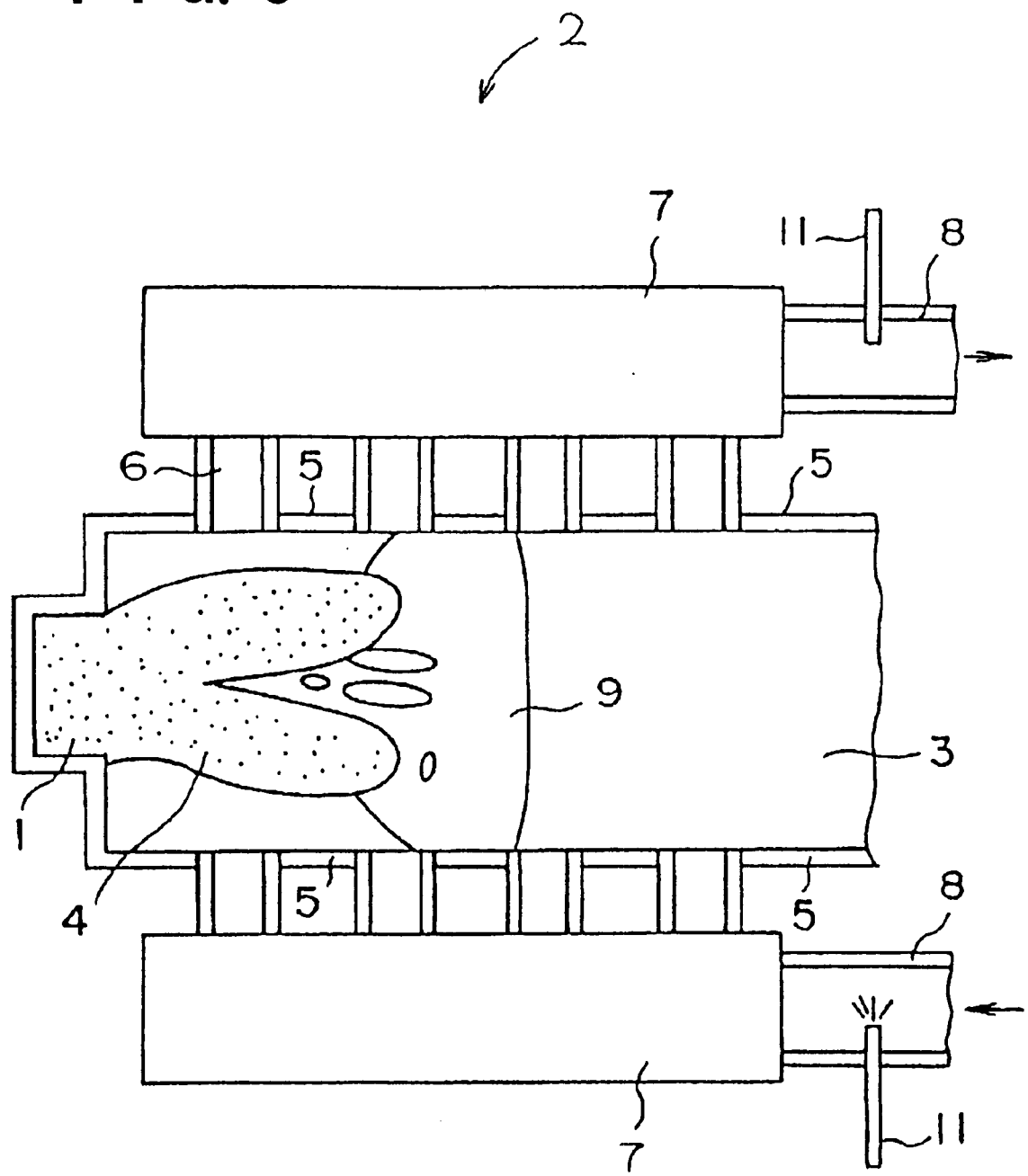
FIG. 3 is a plane view of another example of the glass furnace to which the present invention is applied.

As shown in FIGS. 1, 2 and 3, numeral 1 designates the glass raw port for glass raw material, which is arranged at the upstream end of the glass furnace 2. A glass raw material is fed in layers on the molten glass 3 in the glass furnace 2 to form a glass raw material layer 4 which proceeds forward as being melted. At the side wall 5 of the upper structure of the glass furnace 2, the ports 6 for spouting out a flame from such as an oil burner and air for combustion are provided in the opened state. The ports 6 connect the heat storage chamber 7. One of the heat storage chamber draw in the exhausted gas from the combustion area, which heats the inside space of the heat storage chamber via the stack flue 8 into a chimney during the discharging period. After certain period of time, the air for combustion can be preheated when it passes through the heat storage chamber.

The foam layer, 9 is formed to elongate from around the up stream end of the glass raw material layer 4 toward around the area (a hot spot) of the highest temperature of the glass furnace in a down stream direction. The foam layer has usually a thickness of from 5 to 10 cm and is composed of foam (numerous bubbles). The foam layer exists almost constantly in the position and in the size, since the foam is supplied from the molten glass, while the layer breaks into extinguish from the surface.

In the above glass furnace, there is arranged the spray apparatus 10 as a supply apparatus for supplying directly or indirectly to the foam layer 9 the metal compound, its reaction intermediate compound or its reaction product, preferably a metal oxide, which contains at least one compound of metal selected from the group consisting of aluminum, titanium, silicon, zinc, magnesium, iron, chromium, cobalt, cerium and calcium. The spray apparatus 10 is installed via an opening portion between the upper side wall 5 and the lower side wall 12 of the up stream part of the glass furnace, inserted as directed the tip of the nozzle toward the interior of the furnace. The metal compound is sprayed directly to the foam layer by the apparatus. Accordingly, the foam layer can be remarkably extinguished or diminished to further reduce foam remaining in the product and thus to improve the yield of the product.

In the above glass furnace, a supply apparatus for supplying the metal compound to the foam layer on the molten glass is installed between the upper side wall 5 and the lower side wall 12 of the up stream part of the glass furnace. Instead, in a glass furnace of a heat regenerative type, as shown in FIG. 3, a spray apparatus 11 can be installed at desired position of the stack flue 8, inserted as directed the tip of the nozzle toward the interior of the stack flue 8, wherein the metal compound is sprayed into a combustion air supplied from the stack flue 8 toward the heat storage chamber 7, and is supplied through the port to the combustion area within the glass furnace, whereby the metal compound is indirectly sprayed to the foam layer.

In a glass furnace of a oxygen combustion type, a supply apparatus for supplying the metal compound to the foam layer on the molten glass is installed at a desired position of the side wall of the up stream part of the glass furnace, whereby the metal compound is directly sprayed to the foam layer.

The metal compound, to the foam layer on the molten glass, can be also supplied by using an air feeding path to a glass melting furnace provided with an air combustion burner or an oxygen feeding path to a glass melting furnace provided with an oxygen combustion burner. In this case, the metal compound is carried with the air for combustion or the oxygen gas for combustion in the respective feeding path.

Although a fuel combustion type melting of glass has been explained, the present invention is not limited to the above type. For example, the present invention can be applied to a melting of glass (electric melting type), wherein electric current flows in molten glass.

Now, the present invention will be described with reference to Examples. However, it should be understood that the present invention is by no means restricted to such Examples.

EXAMPLE 1

In the lower stack flue (the heat storage stack flue) for vertical type heat storage chambers at the both sides of a glass melting furnace for preparation of flat glass having a daily production capacity of 500 tons, an external two liquid mix type spray nozzle was installed. By using this spray nozzle propelled by air, a mixed solution of tetrabutyl titanate and toluene ($TiO_2$ converted concentration: 25 g/l) was sprayed to the air for combustion flowed in the stack flue. The spray was continuously conducted with the flow rate of about 3 l/hour.

Before spraying, the foam layer had 4 m in width, 10 m in length and 40 $m^2$ in area. However, after spraying, the area of the foam layer reduced to 4 $m^2$ or below according to visual inspection by naked eyes. As a result of keeping this spraying for 2 weeks, it was recognized that the temperature of the ceiling was lowered and the heat efficiency was improved through the rise in the temperature of the bottom. The amount of oil consumption decreased from 90 kl per day to 89 kl per day, whereby energy saving was attained.

Further, the numbers of the foam in the product also decreased by about 30%, whereby the product efficiency and the quality of the flat glass was improved.

EXAMPLE 2

In the lower stack flue for the heat storage chambers, which was the same as in Example 1, by means of a pipe type nozzle having a diameter of 10 mm, titanium tetrachloride was sprayed into the air for combustion using a nitrogen gas as a carrier with the flow rate of 180 g/hour ($TiO_2$ converted: 77 g/hour). The area of the foam layer reduced to from 1/5 to 1/10.

EXAMPLE 3

At the same portion as in Example 1, a mixed solution of silicon tetrachloride and methanol was sprayed into the air for combustion with a flow rate of from 3 to 4 l/hour ($SiO_2$ converted: 200 g/hour). The area of the foam layer reduced to from 1/5 to 1/10.

EXAMPLE 4

In a glass melting furnace of a city gas combustion type having a daily production capacity of 4 tons, a solution of tetrabutyl titanate dissolved in acetylacetone and ethyl acetate ($TiO_2$ converted concentration: 25 g/l) was sprayed directly to the foam layer with a flow rate of 0.5 l/hour by means of two liquid type spray nozzle.

It was recognized that the foam layer became thin and the surface of the molten glass was like mirror surface. The number of the foam in the glass product decreased by 50% or more.

EXAMPLE 5

At the same entrance of the regenerative heat exchanger of the glass furnace as described in Example 1, various solutions of the metal compounds or suspensions of the metal oxides as identified in Table 1 were sprayed into the air for combustion by means of a two liquid type spray nozzle, whereby the diminishing amount of the foam layer was inspected.

The compositions of the solutions or the suspensions, the amounts of the spraying and diminishing effect of the foam layers were shown in Table 1. In Table 1, ⊙ represents a case where the foam layer decreased by 80% or more, ○ represents a case where the foam layer decreased by from 50% to 60%, and Δ represents a case where the foam layer decreased by from 20% to 50%.

EXAMPLE 6

At the left side of a glass melting furnace of an oxygen gas combustion type for preparation of CRT, an external two liquid mixed type spray nozzle was installed as directed to the interior of the furnace. By means of the nozzle, the solutions of the various metal compounds described in Table 1 were supplied to the foam layer on the molten glass, whereby it was recognized that the foam layer went back by about 1.5 m.

TABLE 1

| Liquid composition Metal compound/solvent | Metal oxide concentration (g/l) | Metal oxide supply amount (g/hr) | Result |
| --- | --- | --- | --- |
| Tetrabutyl titanate/Toluene (Metal compound solution) | $TiO_2$: 25 | $TiO_2$: 150 | ⊙ |
| Tetrabutyl titanate/Kerosene (Metal compound solution) | $TiO_2$: 25 | $TiO_2$: 400 | ⊙ |
| Tetrabutyl titanate/Ethanol (Metal compound solution) | $TiO_2$: 25 | $TiO_2$: 400 | ⊙ |
| Tetrabutyl titanate/Acetylacetone Ethyl acetate (Metal compound solution) | $TiO_2$: 25 | $TiO_2$: 100 | ⊙ |
| Titanium acetylacetate/Toluene (Metal compound solution) | $TiO_2$: 25 | $TiO_2$: 150 | ⊙ |
| Titanium octylene glycol/Toluene (Metal compound solution) | $TiO_2$: 25 | $TiO_2$: 150 | ⊙ |

TABLE 1-continued

| Liquid composition Metal compound/solvent | Metal oxide concentration (g/l) | Metal oxide supply amount (g/hr) | Result |
| --- | --- | --- | --- |
| Ethyl silicate monomer/Toluene (Metal compound solution) | $SiO_2$: 50 | $SiO_2$: 500 | ⊙ |
| Ethyl silicate tetramer/Toluene (Metal compound solution) | $SiO_2$: 50 | $SiO_2$: 500 | ⊙ |
| $TiO_2$/Toluene (Metal compound suspension) | $TiO_2$: 500 | $TiO_2$: 2000 | Δ |
| Aluminum acetylacetone/Methyl alcohol/Toluene (Metal compound solution) | $Al_2O_3$: 63 | $Al_2O_3$: 1260 | ○ |
| $Al_2O_3$/Ethanol (Metal compound suspension) | $Al_2O_3$: 500 | $Al_2O_3$: 2000 | Δ |
| ZnO/Ethanol (Metal compound suspension) | ZnO: 500 | ZnO: 2000 | Δ |
| CaO/Ethanol (Metal compound suspension) | CaO: 500 | CaO: 2000 | Δ |

As described in detail in the foregoing, according to the present invention, in a method for melting glass, it is possible to extinguish or diminish, in a short period of time, the foam layer formed on the surface of the molten glass. It is also possible to suppress the formation of the foam layer.

As a result, a heat efficiency in glass melting can be improved to leading to saving energy. At the same time, a speed and an efficiency of glass preparation can be also improved, and high quality of glass products can be obtained.

What is claimed is:

1. A method for melting glass, comprising:
   melting glass raw material fed to a glass furnace to prepare molten glass;
   wherein at least one metal compound which is a compound of at least one metal selected from the group consisting of aluminum, titanium, silicon, zinc, magnesium, cobalt and calcium is supplied to a foam layer formed on the molten glass to diminish or extinguish the foam layer.

2. The method for melting glass according to claim 1, wherein said metal compound is supplied to the foam layer in the form of a solution, a suspension, a powder or a gas.

3. The method for melting glass according to claim 1, wherein said metal compound is supplied to the foam layer by feeding the metal compound into an oxygen gas for combustion fed to a glass furnace and transporting it together with the oxygen to a combustion area in the glass furnace.

4. The method for melting glass according to claim 1, wherein said metal compound is supplied to the foam layer by feeding the metal compound into a fuel fed to a glass furnace and burning the fuel by means of a combustion burner of the glass furnace.

5. The method for melting glass according to claim 1, wherein said metal compound is supplied to the foam layer by feeding the metal compound into air for combustion fed to a glass furnace and transporting it together with the air to a combustion area of the glass furnace.

6. The method for melting glass according to claim 1, wherein said metal compound is supplied to the foam layer by feeding the metal compound directly to a combustion area in the glass furnace in the form of a solution, a suspension, a powder or a gas.

7. The method for melting glass according to claim 1, wherein said metal compound is supplied to the foam layer by feeding a solution having dissolved in water and/or an organic solvent at least one organic metal compound selected from the group consisting of an organic titanium compound, an organic aluminum compound, an organic silicon compound, an organic zinc compound, an organic magnesium compound, an organic iron compound, an organic chromium compound, an organic cobalt compound and an organic cerium compound.

8. The method for melting glass according to claim 1, wherein said metal compound is supplied to the foam layer by feeding a suspension having suspended in water and/or an organic solvent at least one metal oxide powder selected from the group consisting of aluminum oxide, titanium oxide, silicon oxide, zinc oxide, calcium oxide, magnesium oxide, iron oxide, chromium oxide, cobalt oxide and cerium oxide.

9. The method for melting glass according to claim 1, wherein said metal compound is supplied to the foam layer by feeding a solution having dissolved in water and/or an organic solvent at least one selected from the group consisting of a sulfate, a nitrate and a chloride of at least one metal selected from the group consisting of aluminum, titanium, silicon, zinc, calcium, magnesium, iron, chromium, cobalt and cerium.

10. The method for melting glass according to claim 1, wherein said metal compound has a melting point of 20° C. or less and a boiling point of 200° C. or less, and is supplied to the foam layer in the form of a gas.

11. The method for melting glass according to claim 10, wherein said metal compound is titanium tetrachloride or silicon tetrachloride.

* * * * *